(12) United States Patent
Robertson et al.

(10) Patent No.: US 10,414,492 B2
(45) Date of Patent: Sep. 17, 2019

(54) AIRCRAFT HAVING ROTOR-TO-WING CONVERSION CAPABILITIES

(71) Applicant: Bell Helicopter Textron Inc., Fort Worth, TX (US)

(72) Inventors: Daniel Bryan Robertson, Fort Worth, TX (US); Kirk Landon Groninga, Fort Worth, TX (US); Frank Bradley Stamps, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 596 days.

(21) Appl. No.: 15/251,128

(22) Filed: Aug. 30, 2016

(65) Prior Publication Data
US 2018/0057162 A1    Mar. 1, 2018

(51) Int. Cl.
| | |
|---|---|
| *B64C 29/02* | (2006.01) |
| *B64C 25/52* | (2006.01) |
| *B64C 27/24* | (2006.01) |
| *B64C 27/50* | (2006.01) |
| *B64C 27/54* | (2006.01) |
| *B64C 3/56* | (2006.01) |

(52) U.S. Cl.
CPC .............. *B64C 29/02* (2013.01); *B64C 25/52* (2013.01); *B64C 27/24* (2013.01); *B64C 27/50* (2013.01); *B64C 27/54* (2013.01); *B64C 3/56* (2013.01)

(58) Field of Classification Search
CPC .......... B64C 3/56; B64C 25/52; B64C 27/24; B64C 27/50; B64C 27/54; B64C 29/02
USPC ...................................................... 244/7 B
See application file for complete search history.

(56) References Cited

U.S. PATENT DOCUMENTS

| | | | | |
|---|---|---|---|---|
| 2,328,786 | A | * | 9/1943 | Crowder ................. B64C 29/02 244/17.23 |
| 2,382,460 | A | * | 8/1945 | Young ..................... B64C 29/02 244/17.19 |
| 2,387,762 | A | * | 10/1945 | Leonard .............. B64C 29/0025 244/67 |

(Continued)

FOREIGN PATENT DOCUMENTS

WO    1998002350 A1    1/1998

OTHER PUBLICATIONS

European Examination Report, Application No. 17163295.3, EPO, dated Oct. 24, 2017.

(Continued)

*Primary Examiner* — Richard R. Green
*Assistant Examiner* — Brady W Frazier
(74) *Attorney, Agent, or Firm* — Lawrence Youst PLLC (57) ABSTRACT

A tail sitter aircraft includes a fuselage having a forward portion and an aft portion. The forward portion of the fuselage includes first and second rotor stations. A first rotor assembly is positioned proximate the first rotor station. A second rotor assembly is positioned proximate the second rotor station. A tailboom assembly extends from the aft portion of the fuselage. The tailboom assembly includes a plurality of landing members. In a vertical takeoff and landing mode of the aircraft, the first and second rotor assemblies rotate about the fuselage to provide vertical thrust. In a forward flight mode of the aircraft, the first rotor assembly rotates about the fuselage to provide forward thrust and the second rotor assembly is non-rotatable about the fuselage forming wings to provide lift.

20 Claims, 7 Drawing Sheets

(56) References Cited

U.S. PATENT DOCUMENTS

| | | | | |
|---|---|---|---|---|
| 2,479,125 A | * | 8/1949 | Leonard | B64C 29/0075 244/102 R |
| 2,879,013 A | * | 3/1959 | Herrick | B64C 29/0025 244/221 |
| 5,114,096 A | * | 5/1992 | Wernicke | B64C 29/02 244/45 A |
| 5,289,994 A | * | 3/1994 | Del Campo Aguilera | B64C 27/22 244/12.1 |
| 5,516,060 A | * | 5/1996 | McDonnell | B64C 29/02 244/207 |
| 5,799,900 A | * | 9/1998 | McDonnell | B64C 29/02 244/115 |
| 8,146,854 B2 | * | 4/2012 | Lawrence | B64C 39/024 244/17.23 |
| 8,505,846 B1 | * | 8/2013 | Sanders, II | B64C 29/02 244/7 A |
| 2006/0011777 A1 | * | 1/2006 | Arlton | B64C 27/10 244/7 B |
| 2014/0312177 A1 | * | 10/2014 | Gaonjur | B64C 27/24 244/7 A |

OTHER PUBLICATIONS

European Search Report, Application No. 17163295.3, EPO, dated Oct. 5, 2017.

\* cited by examiner

AIRCRAFT HAVING ROTOR-TO-WING CONVERSION CAPABILITIES

TECHNICAL FIELD OF THE DISCLOSURE

The present disclosure relates, in general, to aircraft that take off and land on their tail and tilt horizontally for forward flight and, in particular, to tail sitter aircraft operable to transition between a dual rotor configuration for vertical takeoff and landing and a single rotor, single wing configuration for forward flight.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, may suffer from downwash inefficiencies during vertical takeoff and landing due to interference caused by the fixed wing.

Tiltwing aircraft feature a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, may be difficult to control during hover as the vertically oriented wing provides a large surface area for crosswinds, typically requiring tiltwing aircraft to have either cyclic rotor control or an additional thrust station to generate a moment.

Tail sitter aircraft land on and take off from their tail section. The longitudinal fuselage axis of a tail sitter aircraft is generally vertical for hover, takeoff and landing and generally horizontal during forward flight. A rotary propulsion system is typically used to generate vertical thrust during takeoff, hover and landing. Horizontal thrust generated by the rotary propulsion system in combination with lift generated by one or more fixed wings enables forward flight. Tail sitter aircraft, however, may lack endurance due to propulsion system inefficiencies during forward flight.

SUMMARY

In a first aspect, the present disclosure is directed to a tail sitter aircraft including a fuselage having a forward portion and an aft portion. The forward portion includes first and second rotor stations. A first rotor assembly is positioned proximate the first rotor station. A second rotor assembly is positioned proximate the second rotor station. A tailboom assembly extends from the aft portion of the fuselage and includes a plurality of landing members. In a vertical takeoff and landing mode of the aircraft, the first and second rotor assemblies rotate about the fuselage to provide vertical thrust. In a forward flight mode of the aircraft, the first rotor assembly rotates about the fuselage to provide forward thrust and the second rotor assembly is non-rotatable about the fuselage forming wings to provide lift.

In some embodiments, the first rotor station may be forward of the second rotor station. In certain embodiments, the first rotor assembly may include at least two rotor blades and the second rotor assembly may include two rotor blades. In such embodiments, the first rotor assembly may have a greater number of rotor blades than the second rotor assembly. In some embodiments, the second rotor assembly may have a larger total rotor disc area than the first rotor assembly. In certain embodiments, the first rotor assembly may have a fixed pitch and the second rotor assembly may have cyclic control and collective control. In other embodiments, the first rotor assembly may have collective control and the second rotor assembly may have cyclic control and collective control.

In embodiments of the tail sitter aircraft, the first and second rotor assemblies may be generally torque matched in vertical takeoff and landing mode, which may be achieved by rotating the first and second rotor assemblies in opposite directions. In some embodiments, the tailboom assembly may be a fixed tailboom assembly. In other embodiments, the tailboom assembly may include a plurality of rotatably mounted tail arms having control surfaces, wherein, in a forward flight configuration, the tail arms are radially retracted to reduce tail surface geometry and, in a landing configuration, the tail arms are radially extended relative to one another about a longitudinal fuselage axis to form a stable ground contact base with the landing members. In certain embodiments, the rotor blades may be foldable such that the rotor blades may be positioned generally parallel with a longitudinal fuselage axis to reduce aircraft geometry in a storage mode of the aircraft.

In a second aspect, the present disclosure is directed to a method of operating a tail sitter aircraft. The method includes supporting a fuselage in a generally vertical attitude on a surface with a plurality of landing members of a tailboom assembly; rotating first and second rotor assemblies about the fuselage to provide vertical thrust in a vertical takeoff and landing mode; rotating the first rotor assembly about the fuselage to provide forward thrust in a forward flight mode; and forming wings with the second rotor assembly by preventing rotation of the second rotor assembly about the fuselage to provide lift in the forward flight mode.

The method may also include operating the first rotor assembly responsive to fixed pitch and operating the second rotor assembly responsive to cyclic control and collective control; operating the first rotor assembly responsive to collective control and operating the second rotor assembly responsive to cyclic control and collective control; generally torque matching the first and second rotor assemblies; rotating the first and second rotor assemblies in opposite directions; performing a rotor-to-wing conversion of the second rotor assembly by stopping the rotation of the second rotor assembly about the fuselage and adjusting an angle of attack of each rotor blade of the second rotor assembly and/or performing a wing-to-rotor conversion of the second rotor assembly by reengaging rotation of the second rotor assembly about the fuselage.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2P are schematic illustrations of a tail sitter aircraft operable for rotor-to-wing conversion in sequential flight operating scenarios in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figures 1A, 1B:
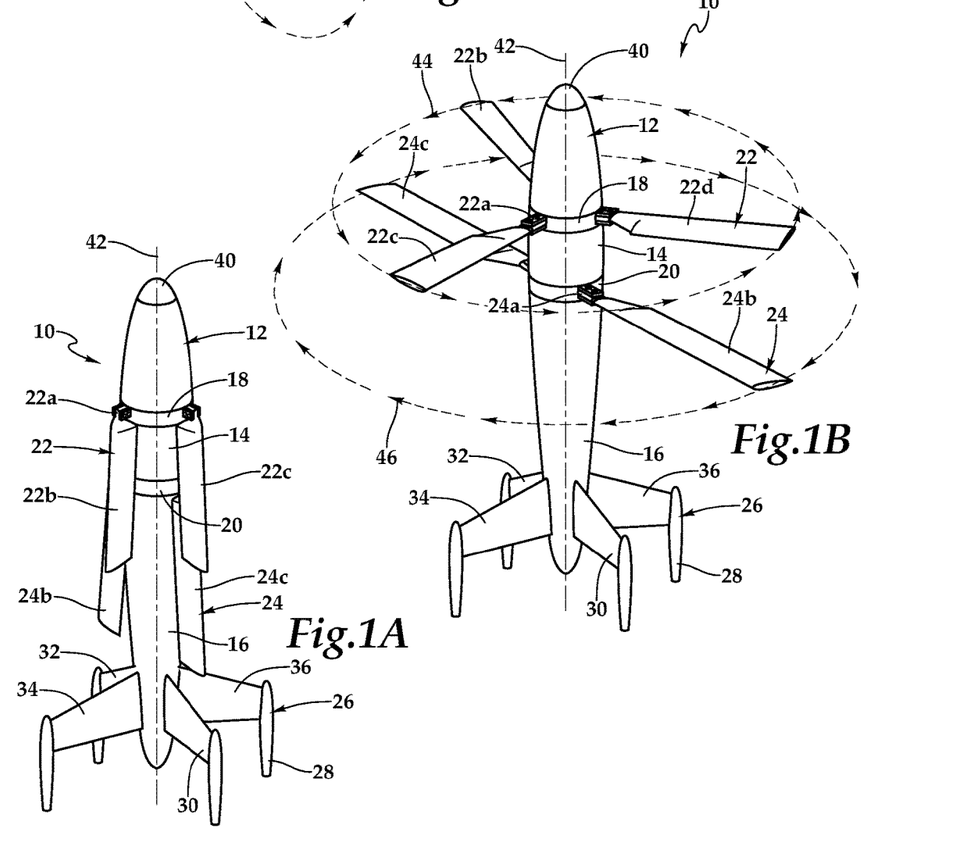
FIGS. 1A-1C are schematic illustrations of a tail sitter aircraft operable for rotor-to-wing conversion in accordance with embodiments of the present disclosure.
Figure 1C:
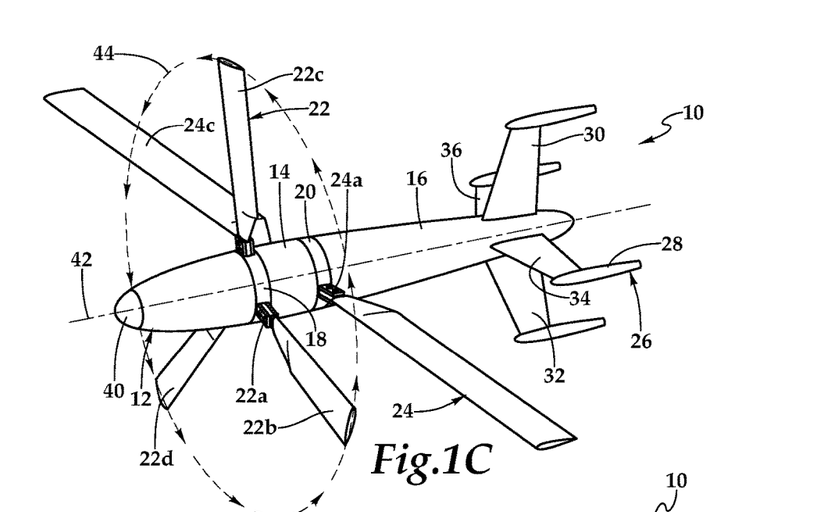

Referring to FIGS. 1A-1C in the drawings, a tail sitter aircraft operable for rotor-to-wing conversion is schematically illustrated and generally designated 10. Aircraft 10 includes a fuselage 12 having a forward portion 14 and an aft portion 16. Forward portion 14 of fuselage 12 includes two rotor stations 18, 20. A rotor assembly 22 is located at rotor station 18 and a rotor assembly 24 is located at rotor station 20. Rotor assembly 22 includes a rotor hub 22a having blades 22b, 22c, 22d coupled thereto. Likewise, rotor assembly 24 includes a rotor hub 24a having blades 24b, 24c coupled thereto. As discussed herein, blades 24b, 24c of rotor assembly 24 are operable to act as rotor blades when aircraft 10 is operating in vertical takeoff and landing mode, as best seen in FIG. 1B, and as wings when aircraft 10 is operating in forward flight mode, as best seen in FIG. 1C.

A tailboom assembly 26 extends from aft portion 16 of fuselage 12. In the illustrated embodiment, tailboom assembly 26 includes a plurality of landing members 28 such as fixed or retractable skid members or shock absorbing members such as a pneumatic shock struts or mechanical spring assemblies. Landing members 28 may also include wheels (not pictured) to assist in ground maneuvers. Tailboom assembly 26 includes a plurality of control surfaces used during forward flight depicted as rudders 30, 32 for yaw control and elevators 34, 36 for pitch control, in the illustrated configuration. It is noted that tail sitter aircraft 10 may fly in other orientations wherein the control surfaces may serve alternate functions. Preferably, aircraft 10 includes a sensor system 40 located in the nose of fuselage 12. Sensor system 40 may include positioning sensors, attitude sensors, speed sensors, environmental sensors, temperature sensors, target sensors and the like. Alternatively or additionally, sensor system 40 may include surveillance systems such as a spherical camera that may be pointed at any target of interest forward of rotor assembly 22.

Aircraft 10 may be an unmanned aircraft system (UAS), also known as an unmanned aerial vehicle (UAV) or a drone, that is self-powered, does not carry a human operator, uses aerodynamic forces to provide vehicle lift, is autonomously and/or remotely operated, may be expendable or recoverable and may carry lethal or nonlethal payloads. In such embodiments, aircraft 10 may be used in military, commercial, scientific, recreational and other applications. In addition, groups of aircraft, similar or identical to aircraft 10, may be networked together such that they are capable of cooperating with one another and exhibiting swarm behavior including, for example, the ability to dynamically adapt responsive to changing conditions or parameters, the ability for group coordination, distributed control, distributed tactical group planning, distributed tactical group goals, distributed strategic group goals and/or fully autonomous swarming. In one example, one or more aircraft 10 may engage a target by launching missiles from aft portion 16 of fuselage 12, when aircraft 10 is in forward flight mode. Alternatively, aircraft 10 could be a manned aircraft operable for onboard pilot control over some or all aspects of flight operations.

As best seen in FIG. 1A, aircraft 10 has a storage mode in which aircraft 10 has a small ground geometry. As illustrated, blades 22b, 22c, 22d of rotor assembly 22 are foldable relative to rotor hub 22a such that blades 22b, 22c, 22d extend in the aft direction generally parallel to a longitudinal fuselage axis 42 of aircraft 10. Similarly, blades 24b, 24c of rotor assembly 24 are foldable relative to rotor hub 24a such that blades 24b, 24c extend in the aft direction generally parallel to longitudinal fuselage axis 42 of aircraft 10. Preferably, blades 22b, 22c, 22d are coupled to rotor hub 22a at lockable hinge members that are operable to lock blades 22b, 22c, 22d in the radially extending operating configuration of FIGS. 1B and 1C, and in the aftwardly extending storage configuration of FIG. 1A. Likewise, blades 24b, 24c are coupled to rotor hub 24a at lockable hinge members that are operable to lock blades 24b, 24c in the radially extending operating configuration of FIGS. 1B and 1C, and in the aftwardly extending storage configuration of FIG. 1A.

Operation of blades 22b, 22c, 22d and blades 24b, 24c between the radially extending operating configuration and the aftwardly extending storage configuration is preferably manual, wherein an operator sequentially unlocks blades 22b, 22c, 22d, 24b, 24c from their current configuration, shifts blade 22b, 22c, 22d, 24b, 24c to their desired configuration and then locks blades 22b, 22c, 22d, 24b, 24c in the desired configuration. Alternatively, operation of blades 22b, 22c, 22d and blades 24b, 24c between the radially extending operating configuration and the aftwardly extending storage configuration could be automated using, for example, electrically driven actuators. In storage mode, aircraft 10 occupies minimal ground space and has a suitable geometry for crating and/or palletizing for storage and/or transportation with other similar aircraft 10.

As best seen in FIG. 1B, aircraft 10 has a vertical takeoff and landing mode in which aircraft 10 has a generally vertical attitude. As illustrated, blades 22b, 22c, 22d of rotor assembly 22 are in the radially extending operating configuration generally perpendicular to longitudinal fuselage axis 42 of aircraft 10. Similarly, blades 24b, 24c of rotor assembly 24 are in the radially extending operating configuration generally perpendicular to longitudinal fuselage axis 42 of aircraft 10. Blades 22b, 22c, 22d may have moderate twist and have generally symmetrical airfoils. Blades 24b, 24c preferably have little or no twist and have generally symmetrical airfoils. It should be understood, however, that blades 22b, 22c, 22d and blades 24b, 24c could have other blade designs that are known to those having ordinary skill in the art. As discussed herein, the pitch of blades 22b, 22c, 22d may be fixed or may preferably be collectively controlled but may also be cyclically controlled using, for example, a rise and fall swash plate. The pitch of blades 24b, 24c is preferably collectively and cyclically controlled using, for example, a rise and fall swash plate.

In the illustrated embodiment, rotor assembly 22 has a greater number of blades but a smaller total rotor disc area than rotor assembly 24 as the span of blades 22b, 22c, 22d is less than the span of blades 24b, 24c. In general, a larger rotor has lower disc loading and higher lift to thrust efficiency. When viewed from above, rotor assembly 22 rotates in a counterclockwise direction, as indicated by directional motion arrows 44, and rotor assembly 24 rotates in a clockwise direction, as indicated by directional motion arrows 46. As discussed herein, rotor assemblies 22, 24 are preferably coupled to the same drive system and are operable to rotate at same or different rotational speeds depending upon the individual gearing. In addition, the counter rotation of rotor assemblies 22, 24 preferably results in substantial torque matching of aircraft 10 in vertical takeoff and landing mode. In this manner, aircraft 10 has vertical thrust and is stable relative to rotation about longitudinal fuselage axis 42 in vertical takeoff and landing mode including during hover operations.

As best seen in FIG. 1C, aircraft 10 has a forward flight mode in which aircraft 10 has a generally horizontal attitude. As illustrated, blades 22b, 22c, 22d of rotor assembly 22 are in the radially extending operating configuration generally perpendicular to longitudinal fuselage axis 42 of aircraft 10 and are rotating in a counterclockwise direction, when viewed from the in front of aircraft 10, as indicated by directional motion arrows 44. Blades 24b, 24c of rotor assembly 24 are in the radially extending operating configuration generally perpendicular to longitudinal fuselage axis 42 of aircraft 10. As illustrated, the counter rotation of rotor assembly 24 has stopped and blades 24b, 24c have been turned such that the leading edges of the airfoils are generally forward forming a wing configuration to provide lift for aircraft 10. In forward flight mode, pitch adjustments of blades 24b, 24c may be used for roll control, with yaw and pitch control of aircraft 10 being provided by rudders 30, 32 and elevators 34, 36 of tailboom assembly 26.

Figures 2A, 2B, 2C, 2D, 2E, 2F:
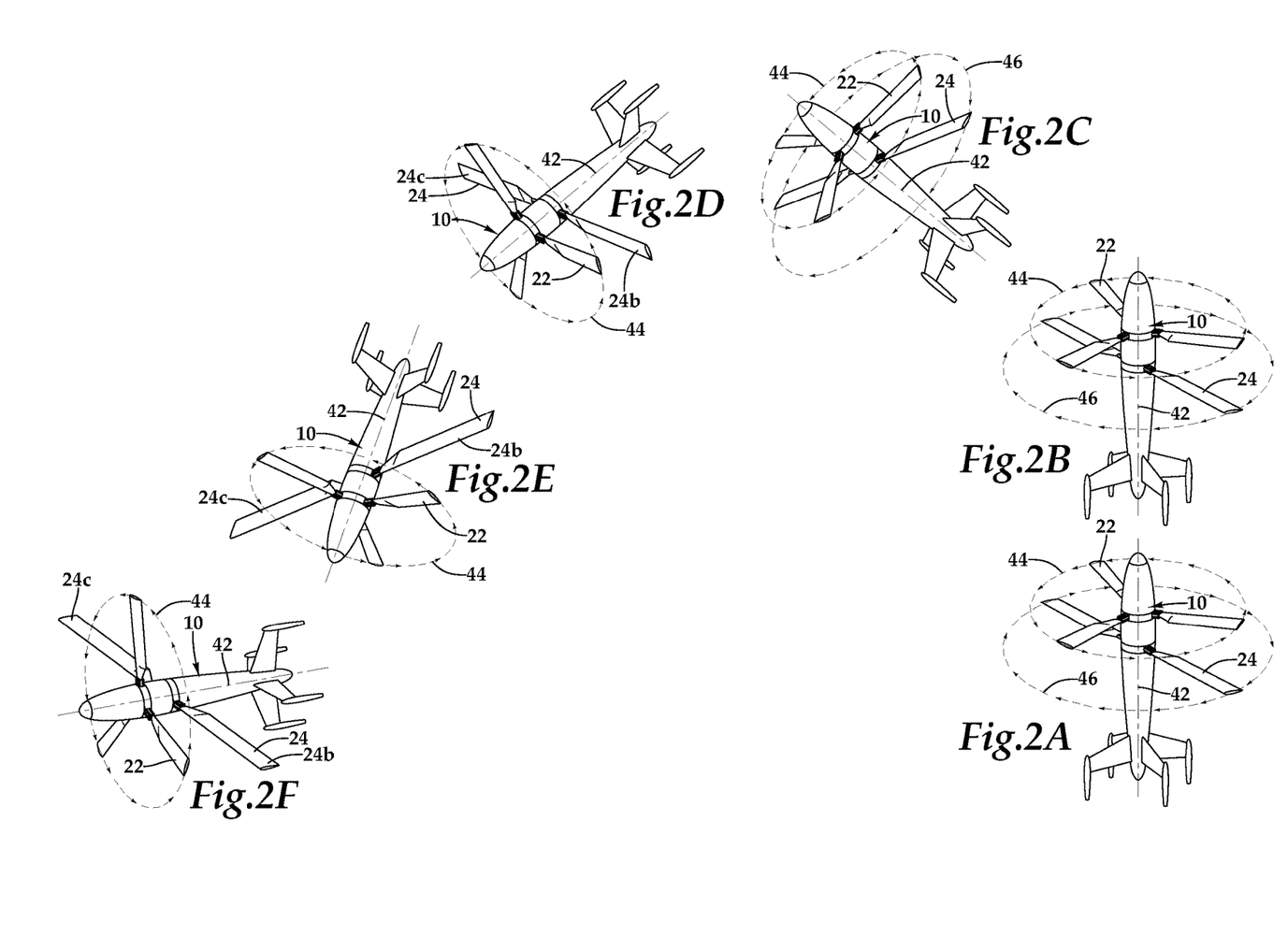
Figures 2G, 2H, 2I, 2J, 2K:
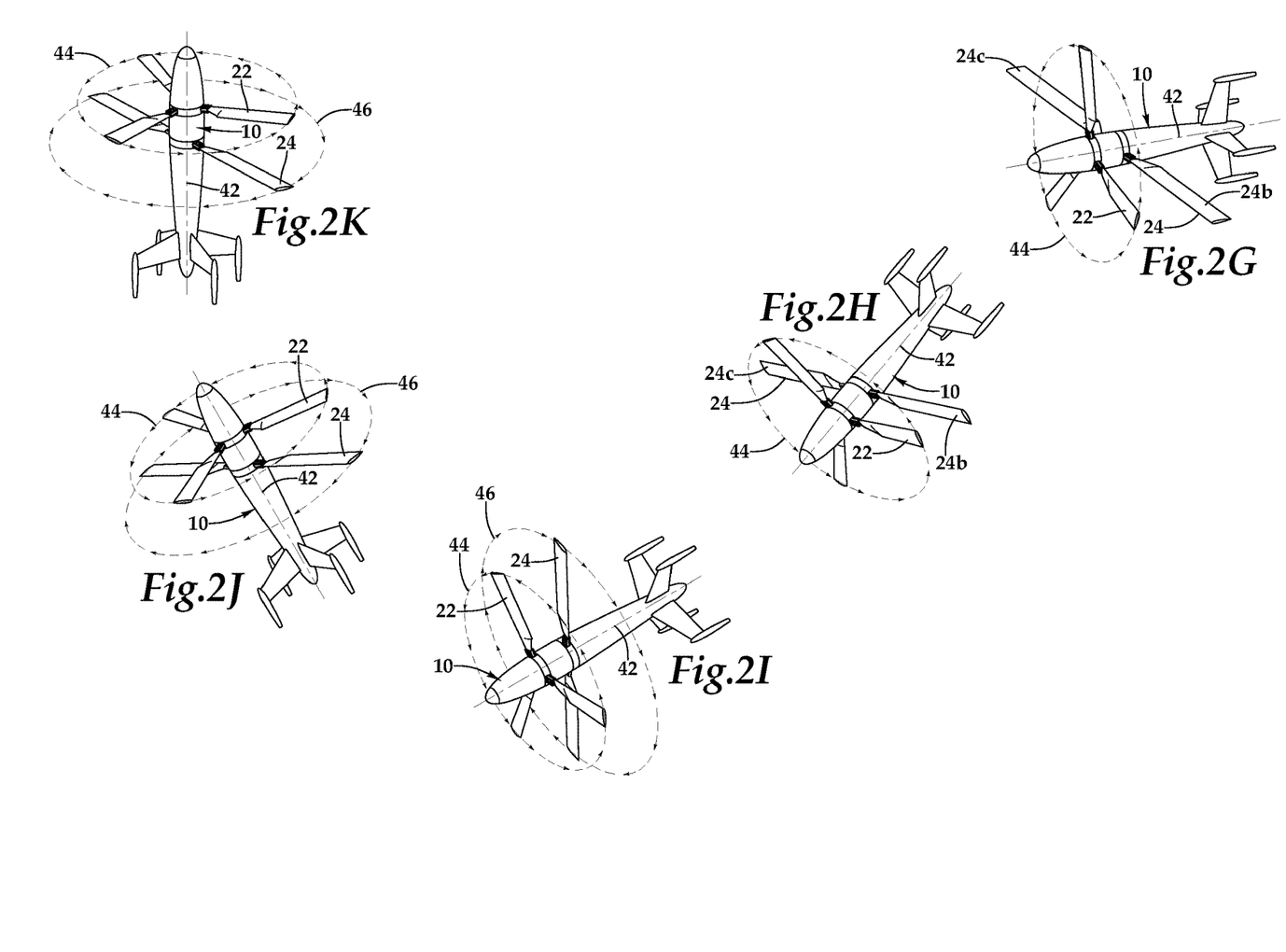
Figure 2L:
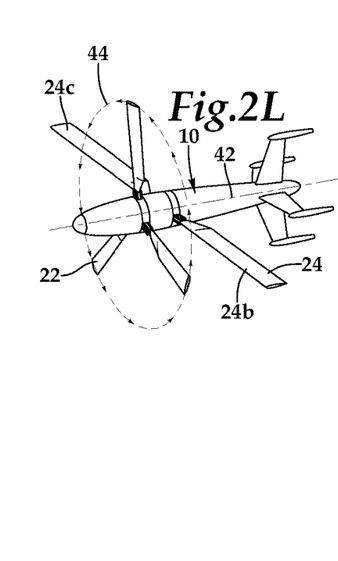
Figure 2M:
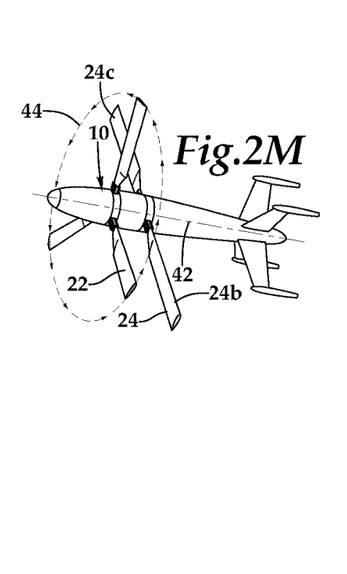
Figures 2N, 2O:
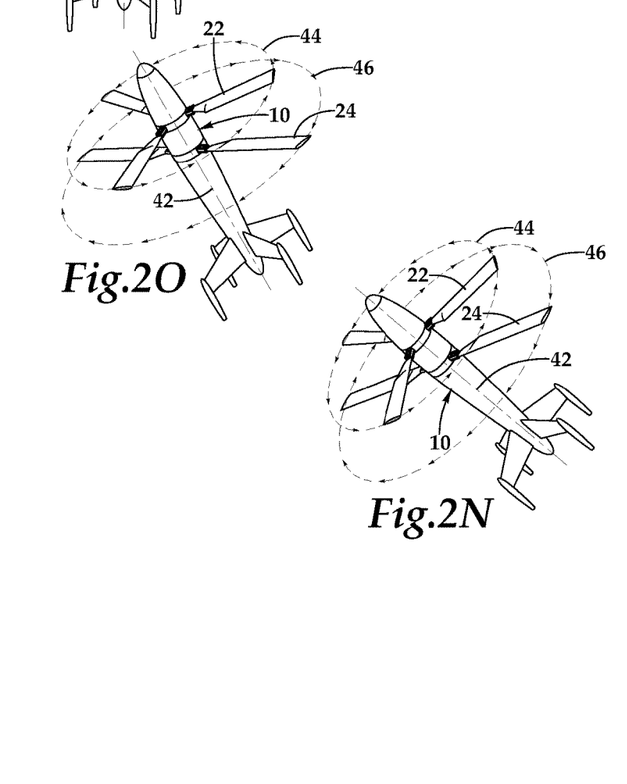
Figure 2P:
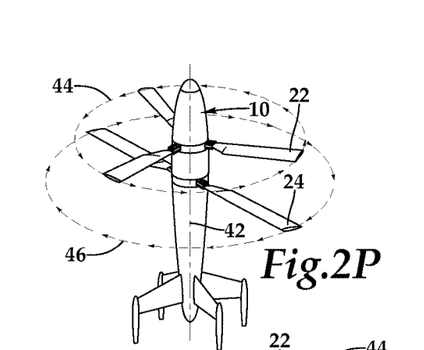

Referring next to FIGS. 2A-2P in the drawings, sequential flight-operating scenarios of a tail sitter aircraft operable for rotor-to-wing conversion are depicted. Tail sitter aircraft 10 may be a manned or unmanned aircraft and may be operated responsive to onboard pilot flight control, remote flight control or autonomous flight control. Tail sitter aircraft 10 is preferably a fly-by-wire aircraft operated by a flight control system including an onboard flight control computing system, such as a digital flight control computer, and a plurality of sensor and controller operably associated with the mechanical systems of aircraft 10 including the engine, the transmissions, the rotor assemblies and the pitch control assemblies, to name a few. As best seen in FIG. 2A, tail sitter aircraft 10 is hovering in its vertical takeoff and landing mode with longitudinal fuselage axis 42 in a generally vertical attitude. Rotor assemblies 22, 24 are providing vertical thrust and operating in counter rotation as indicated by directional motion arrows 44, 46. Rotor assemblies 22, 24 are preferably torque matched, thus preventing aircraft 10 from rotating about longitudinal fuselage axis 42.

As best seen in FIG. 2B, tail sitter aircraft 10 is beginning a transition from vertical takeoff and landing mode to forward flight mode. Aircraft 10 embarks on a vertical assent to a desired elevation with longitudinal fuselage axis 42 in a generally vertical attitude and rotor assemblies 22, 24 providing vertical thrust as indicated by directional motion arrows 44, 46. Once aircraft 10 reaches the desired elevation, longitudinal fuselage axis 42 is rotated toward a nose-down attitude to perform the rotor-to-wing conversion, as seen in the progression of FIGS. 2C-2E. In FIG. 2C, rotor assemblies 22, 24 are operating to provide thrust as indicated by directional motion arrows 44, 46. In FIG. 2D, after aircraft 10 is in the nose down attitude, aircraft 10 looses altitude while airspeed increases. During this maneuver, power to rotor assembly 24 is shut down and aerodynamic braking slows and stops the rotation of rotor assembly 24 about the fuselage. Collective control is then used to adjust the pitch of blades 24b, 24c of rotor assembly 24, such that the leading edges of the airfoils are generally forward, as best seen in FIG. 2E, thereby completing the rotor-to-wing conversion. During the rotor-to-wing conversion process of rotor assembly 24, rotor assembly 22 continuously provides thrust, as indicated by directional motion arrows 44 in FIGS.

2D, 2E. Rotor assembly 24 is now in a wing configuration that is operable to provide lift for aircraft 10 responsive to forward airspeed. Once in this configuration, rotor assembly 22 is operable to provide the required forward thrust, as indicated by directional motion arrows 44, and blades 24b, 24c are operable to provide lift, enabling the forward flight mode of aircraft 10, as best seen in FIG. 2F.

As tail sitter aircraft 10 approaches the destination, longitudinal fuselage axis 42 is shifted from the horizontal attitude of forward flight mode back to the vertical attitude of vertical takeoff and landing mode. Depending upon factors such as airspeed, altitude, prevailing conditions and other factors known to those having ordinary skill in the art, aircraft 10 may engage in a variety of maneuvers to achieve this transition. For example, as best seen in FIG. 2G, aircraft 10 remains in the forward flight mode at a desired altitude with rotor assembly 22 operating to provide the required forward thrust, as indicated by directional motion arrows 44, and blades 24b, 24c providing lift. Aircraft 10 is now ready to perform the wing-to-rotor conversion, as seen in the progression of FIGS. 2G-2I. As illustrated in FIG. 2H, longitudinal fuselage axis 42 is rotated toward a nose-down attitude, enabling aircraft 10 to increase airspeed while decreasing altitude. Collective control is then used to adjust the pitch of blades 24b, 24c of rotor assembly 24 such that the leading edges of the airfoils are oriented for rotary motion. Torque and rotational energy is now applied to rotor assembly 24 causing rotor assembly 24 to begin counter rotation, as indicated by directional motion arrows 46 in FIG. 2I, thereby completing the wing-to-rotor conversion. During the wing-to-rotor conversion process of rotor assembly 24, rotor assembly 22 continuously provides thrust, as indicated by directional motion arrows 44 in FIGS. 2H, 2I. When rotor assembly 24 reaches the desired rotational speed and thrust output, aircraft 10 can turn nose up, as best seen in FIG. 2J. Thereafter, aircraft 10 can return to the vertical takeoff and landing mode with rotor assemblies 22, 24 providing the required vertical thrust output, as best seen in FIG. 2K.

In another example, as best seen in FIG. 2L, aircraft 10 remains in the forward flight mode with rotor assembly 22 providing the required forward thrust, as indicated by directional motion arrows 44, and blades 24b, 24c providing lift. Aircraft 10 is now ready to perform the wing-to-rotor conversion, as seen in the progression of FIGS. 2L-2N. As illustrated in FIG. 2M, starting from a desired altitude, longitudinal fuselage axis 42 is rotated toward a nose-up attitude. Collective control is then used to adjust the pitch of blades 24b, 24c of rotor assembly 24 such that the leading edges of the airfoils are oriented for rotary motion. Torque and rotational energy is now applied to rotor assembly 24 causing rotor assembly 24 to begin counter rotation, as indicated by directional motion arrows 46 in FIG. 2N, thereby completing the wing-to-rotor conversion. During the wing-to-rotor conversion process of rotor assembly 24, rotor assembly 22 continuously provides thrust, as indicated by directional motion arrows 44 in FIGS. 2M, 2N. As rotor assembly 24 reaches the desired rotational speed and thrust output, aircraft 10 continues to ascend, as best seen in FIG. 2O. Thereafter, aircraft 10 can return to the vertical takeoff and landing mode with rotor assemblies 22, 24 providing the required vertical thrust output, as best seen in FIG. 2P.

Figures 3A, 3B, 3C:
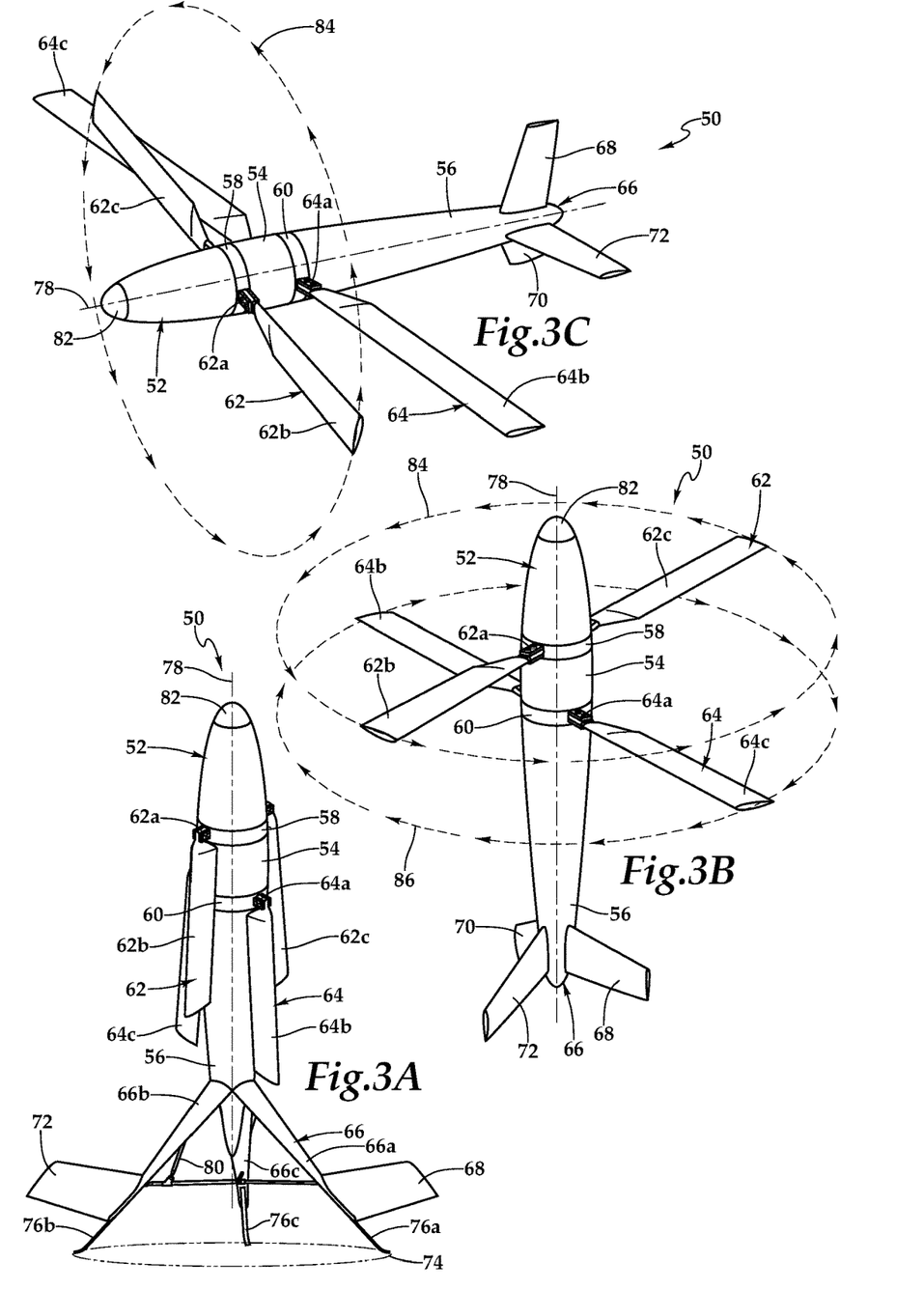
FIGS. 3A-3C are schematic illustrations of a tail sitter aircraft operable for rotor-to-wing conversion in accordance with embodiments of the present disclosure.

Referring next to FIGS. 3A-3C in the drawings, a tail sitter aircraft operable for rotor-to-wing conversion is schematically illustrated and generally designated 50. Aircraft 50 includes a fuselage 52 having a forward portion 54 and an aft portion 56. Forward portion 54 of fuselage 52 includes two rotor stations 58, 60. A rotor assembly 62 is located at rotor station 58 and a rotor assembly 64 is located at rotor station 60. Rotor assembly 62 includes a rotor hub 62a having blades 62b, 62c coupled thereto. Likewise, rotor assembly 64 includes a rotor hub 64a having blades 64b, 64c coupled thereto. As discussed herein, blades 64b, 64c of rotor assembly 64 are operable to act as rotor blades when aircraft 50 is operating in vertical takeoff and landing mode, as best seen in FIG. 3B, and as wings when aircraft 50 is operating in forward flight mode, as best seen in FIG. 3C.

A tailboom assembly 66 extends from aft portion 56 of fuselage 52. Tailboom assembly 66 includes a plurality of tail arms 66a, 66b, 66c that are operable to be radially retracted in forward flight, as best seen in FIG. 3C, forming a small tail surface geometry wherein control surfaces 68, 70, 72 provide yaw and pitch control. In addition, tail arms 66a, 66b, 66c are operable to be radially extended for landing, as best seen in FIG. 3A, forming a stable ground contact base, as indicated at 74. As illustrated, each tail arm 66a, 66b, 66c includes one of the control surface 68, 70, 72 and each tail arm 66a, 66b, 66c includes a landing member 76a, 76b, 76c such as a fixed or retractable skid member or shock absorbing member such as a pneumatic shock strut or mechanical spring assembly. Landing members 76a, 76b, 76c may also include wheels to assist in ground maneuvers. The length of tail arms 66a, 66b, 66c as well as the angle tail arms 66a, 66b, 66c make with longitudinal fuselage axis 78 in the landing configuration may be determined based upon the location of the center of gravity of tail sitter aircraft 50. Preferably, the center of gravity should be located within the tip over angle from ground contact base 74 of landing member 76a, 76b, 76c, wherein the tip over angle may be about 55 degrees. Tailboom assembly 66 includes an actuator assembly 80 operable to transition tail arms 66a, 66b, 66c between the flight configuration and the landing configuration. Tail arms 66a, 66b, 66c may also include one more sensors that indicate the position of tail arms 66a, 66b, 66c such as the fully retracted position and the fully deployed position as well as fault positions if tail arms 66a, 66b, 66c fail to reach the fully retracted and/or the fully deployed positions. Tail arms 66a, 66b, 66c may also include a fail safe mechanism to bias tail arms 66a, 66b, 66c toward the landing configuration in the event of a tail arm fault.

Preferably, aircraft 50 includes a sensor system 82 located in the nose of fuselage 52. Sensor system 82 may include positioning sensors, attitude sensors, speed sensors, environmental sensors, temperature sensors, target sensors and the like. Alternatively or additionally, sensor system 82 may include surveillance systems such as a spherical camera that may be pointed at any target of interest forward of rotor assembly 62. Aircraft 50 may be an unmanned aircraft system (UAS) as discussed herein. Alternatively, aircraft 50 could be a manned aircraft operable for onboard pilot control over some or all aspects of flight operations.

As best seen in FIG. 3A, aircraft 50 has a landing configuration in which blades 62b, 62c of rotor assembly 62 are foldable relative to rotor hub 62a such that blades 62b, 62c extend in the aft direction generally parallel to a longitudinal fuselage axis 78 of aircraft 50. Similarly, blades 64b, 64c of rotor assembly 64 are foldable relative to rotor hub 64a such that blades 64b, 64c extend in the aft direction generally parallel to longitudinal fuselage axis 78 of aircraft 50. Preferably, blades 62b, 62c are coupled to rotor hub 62a at lockable hinge members that are operable to lock blades 62b, 62c in the radially extending operating configuration of FIGS. 3B and 3C, and in the aftwardly extending storage configuration of FIG. 3A. Likewise, blades 64b, 64c are coupled to rotor hub 64a at lockable hinge members that are operable to lock blades 64b, 64c in the radially extending operating configuration of FIGS. 3B and 3C, and in the aftwardly extending storage configuration of FIG. 3A. Operation of blades 62b, 62c and blades 64b, 64c between the radially extending operating configuration and the aftwardly extending storage configuration is preferably manual but could alternatively be automated using, for example, electrically driven actuators.

As best seen in FIG. 3B, aircraft 50 has a vertical takeoff and landing mode in which aircraft 50 has a generally vertical attitude. As illustrated, blades 62b, 62c of rotor assembly 62 are in the radially extending operating configuration generally perpendicular to longitudinal fuselage axis 78 of aircraft 50. Similarly, blades 64b, 64c of rotor assembly 64 are in the radially extending operating configuration generally perpendicular to longitudinal fuselage axis 78 of aircraft 50. Blades 62b, 62c may have moderate twist and have generally symmetrical airfoils. Blades 64b, 64c preferably have little or no twist and have generally symmetrical airfoils. It should be understood, however, that blades 62b, 62c and blades 64b, 64c could have other blade designs that are known to those having ordinary skill in the art. As discussed herein, the pitch of blades 62b, 62c is preferably collectively controlled but may also be cyclically controlled using, for example, a rise and fall swash plate. The pitch of blades 64b, 64c is preferably collectively and cyclically controlled using, for example, a rise and fall swash plate.

In the illustrated embodiment, rotor assemblies 62, 64 have substantially the same total rotor disc area as the span of blades 62b, 62c is substantially the same as the span of blades 64b, 64c. When viewed from above, rotor assembly 62 rotates in a counterclockwise direction, as indicated by directional motion arrows 84, and rotor assembly 64 rotates in a clockwise direction, as indicated by directional motion arrows 86. Rotor assemblies 62, 64 are preferably coupled to the same drive system and operate at the same rotational speeds such that counter rotation of rotor assemblies 62, 64 results in substantial torque matching of aircraft 50 in vertical takeoff and landing mode. In this manner, aircraft 50 has vertical thrust and is stable relative to rotation about longitudinal fuselage axis 78 in vertical takeoff and landing mode including during hover operations.

As best seen in FIG. 3C, aircraft 50 has a forward flight mode in which aircraft 50 has a generally horizontal attitude. As illustrated, blades 62b, 62c of rotor assembly 62 are in the radially extending operating configuration generally perpendicular to longitudinal fuselage axis 78 of aircraft 50 and are rotating in a counterclockwise direction, when viewed from the in front of aircraft 50, as indicated by directional motion arrows 84. Blades 64b, 64c of rotor assembly 64 are in the radially extending operating configuration generally perpendicular to longitudinal fuselage axis 78 of aircraft 50. As illustrated, the counter rotation of rotor assembly 64 has stopped and blades 64b, 64c have been turned such that the leading edges of the airfoils are generally forward forming a wing configuration to provide lift for aircraft 50. In forward flight mode, pitch adjustments of blades 64b, 64c may be used for roll control, with yaw and pitch control of aircraft 50 being provided by rudder 68 and elevators 70, 72 of tailboom assembly 66.

Figure 4:
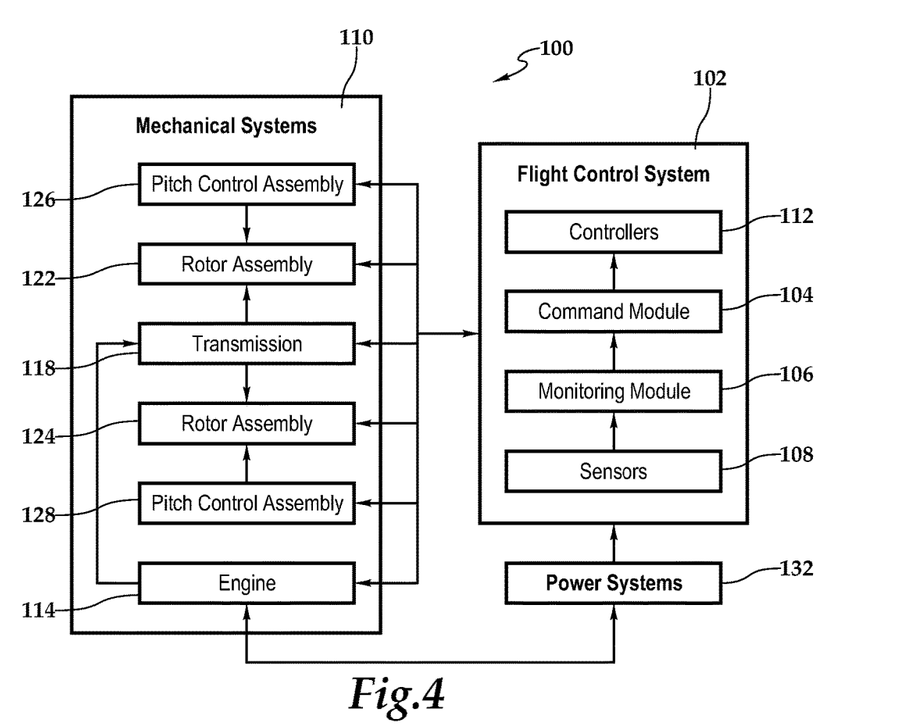
FIG. 4 is a systems diagram of a tail sitter aircraft operable for rotor-to-wing conversion in accordance with embodiments of the present disclosure.

Referring next to FIG. 4 in the drawings, a systems diagram of a tail sitter aircraft operable for rotor-to-wing conversion of the present disclosure is generally designated 100. As discussed herein, the aircraft of the present disclosure may be operated autonomously responsive to commands generated by a flight control system 102 including, for example, a digital flight control system that preferably includes a non-transitory computer readable storage medium including a set of computer instructions executable by a processor. Aspects of flight control system 102 may be implemented on a general-purpose computer, a special purpose computer or other machine with memory and processing capability. For example, flight control system 102 may include one or more memory storage modules including, but is not limited to, internal storage memory such as random access memory, non-volatile memory such as read only memory, removable memory such as magnetic storage memory, optical storage, solid-state storage memory or other suitable memory storage entity. Aspects of flight control system 102 may be microprocessor-based systems operable to execute program code in the form of machine-executable instructions. In addition, flight control system 102 may be selectively connectable to other computer systems via a proprietary encrypted network, a public encrypted network, the Internet or other suitable communication network that may include both wired and wireless connections.

In the illustrated embodiment, flight control system 102 includes a command module 104 and a monitoring module 106. It is to be understood by those having ordinary skill in the art that these and other modules executed within flight control system 102 may be implemented in a variety of forms including hardware, software, firmware, special purpose processors and combinations thereof. Flight control system 102 including a plurality of sensors 108 that obtain input from a variety of sources such as data relating to parameters of the various mechanical systems 110. In addition, sensors 108 may obtain data relating to other important flight or mission parameters such as positioning data, attitude data, speed data, environmental data, temperature data, target data and the like. Flight control system 102 including a plurality of controllers 112 that provide inputs to the various mechanical systems 110 to enable operations.

In the illustrated embodiment, mechanical systems 110 include an engine 114, a transmission 118, rotor assemblies 122, 124 and pitch control assemblies 126, 128. Engine 114 may be may be liquid fuel powered engine such as gasoline, jet fuel or diesel powered engine including a rotary engine such as a dual rotor or tri rotor engine or other high power-to-weight ratio engine. Such a liquid fuel powered engine may return power to power system 132 via a generator during rotary operations. Alternatively, engine 114 may be an electric motor operated responsive electrical power supplied power systems 132. Preferably, however, engine 114 is a hybrid drive system including both a liquid fuel powered engine and one or more electric motors. In this configuration, for example, the liquid fuel powered engine may be used to provide the required rotary power to rotor assembly 122 in forward flight mode and may charge batteries associated with the electrical motor. During vertical takeoff and landing mode, the rotary power output of the liquid fuel powered engine may be augmented by the electrical motor to supply the required rotary power to rotor assemblies 122, 124.

Engine 114 is mechanically coupled to transmission 118 via a drive shaft or other suitable connection. Transmission 118 includes one or more clutch assemblies or other suitable engagement assemblies to enable selective coupling and decoupling between engine 114 and rotor assembly 124 such that engine power to rotor assembly 124 can be engaged in vertical takeoff and landing mode and disengaged in forward flight mode. Transmission 118 is preferably located between rotor assemblies 122, 124 and includes a spiral bevel gearbox having suitable reduction for enabling counter rotation of rotor assemblies 122, 124 at the same or different rotational speeds. Pitch control assembly 126 controls the pitch of the blades of rotor assembly 122 while pitch control assembly 128 controls the pitch of the blades of rotor assembly 124. Pitch control assembly 126 preferably includes a rise and fall swash plate operable to provide collective pitch control to rotor assembly 122 in all operational modes of the aircraft. Not providing cyclic pitch control to rotor assembly 122 enables the use of a simplified pitch control assembly 126 with fewer inputs and fewer components, however, in some embodiments, cyclic pitch control may be provided to rotor assembly 122. Pitch control assembly 128 preferably includes a rise and fall swash plate operable to provide full helicopter type pitch control including both collective and cyclic pitch control in vertical takeoff and landing mode, collective pitch control in forward flight mode and collective pitch control during rotor-to-wing and wing-to-rotor conversions. More specifically, pitch control assembly 128 is operable to adjust the pitch of the blades such that the leading edges of the airfoils are generally forward for forward flight mode. In addition, pitch control assembly 128 is operable to adjust the pitch of the blades during forward flight mode to provide roll control for the aircraft.

In one operational example, flight control system 102, which receives electrical power from power systems 132, may receive a mission from an external source such as a command and control system. Thereafter, flight control system 102 may autonomously control all aspects of flight of an aircraft of the present disclosure. During the various operating modes of an aircraft of the present disclosure including vertical takeoff and landing mode, hovering mode, forward flight mode and transitions therebetween, command module 104 provides commands to controllers 112 to establish the desired operating positions of the various mechanical systems 110. For example, these commands may relate to the engagement or disengagement of engine 114 with rotor assembly 124, the position of pitch control assembly 126 and the position of pitch control assembly 128, to name a few. Flight control system 102 receives feedback from sensors 108 that are associated with the various mechanical systems 110. This feedback is processes by monitoring module 106, which supplies correction data and other information to command module 104. Monitoring module 106 preferably receives and processes additional sensor information such as position data, attitude data, speed data, environmental data, fuel data, temperature data, location data and the like. Monitoring module 106 provides the processed information to command module 104 to further enhance autonomous flight control capabilities. In some embodiments, some or all of the autonomous control capability of flight control system 102 may be augmented or supplanted by remote flight control from a command and control station via a communication link, such as a wireless communication channel. Alternatively or additionally, some or all of the autonomous and/or remote flight control of flight control system 102 may be augmented or supplanted by onboard pilot flight control in manned embodiments.

Figure 5:
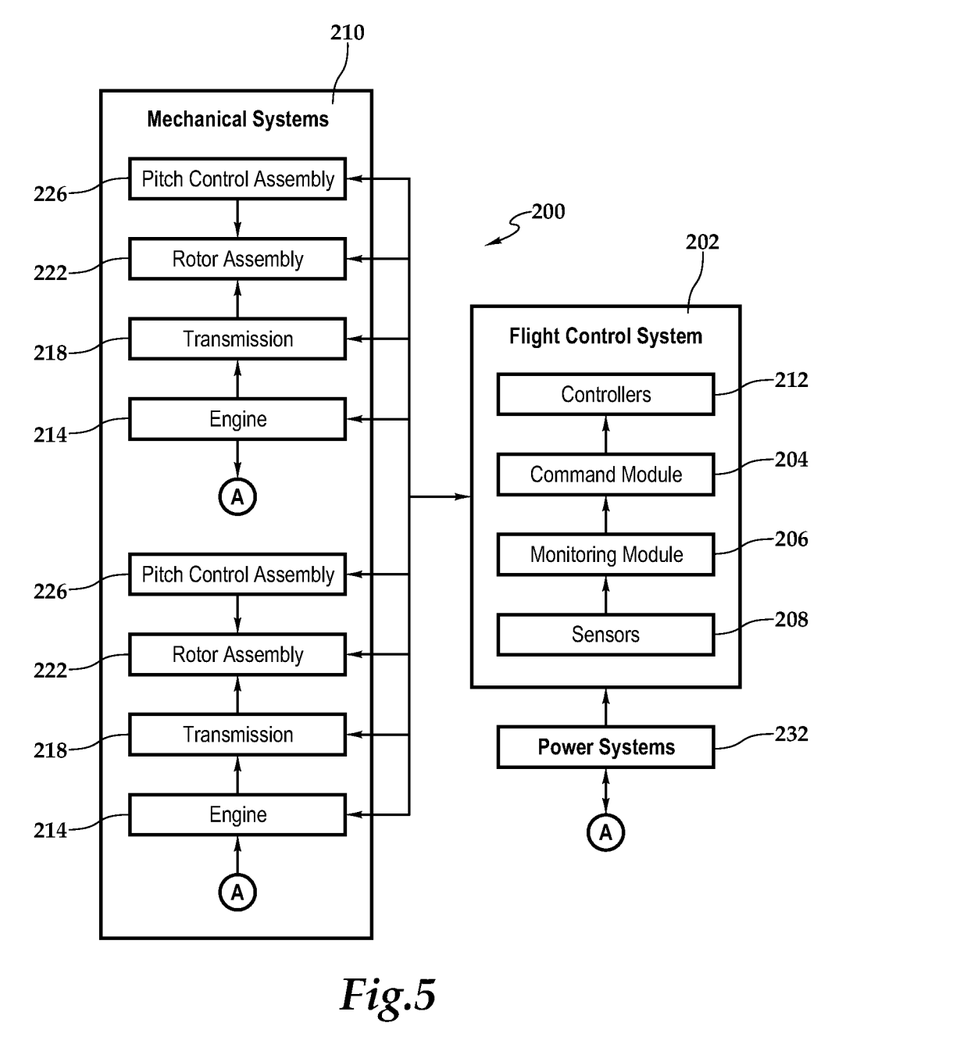
FIG. 5 is a systems diagram of a tail sitter aircraft operable for rotor-to-wing conversion in accordance with embodiments of the present disclosure.

Referring next to FIG. 5 in the drawings, a systems diagram of a tail sitter aircraft operable for rotor-to-wing conversion of the present disclosure is generally designated 200. In the illustrated embodiment, flight control system 202 includes a command module 204, a monitoring module 206, a plurality of sensors 208 and a plurality of controllers 212. In the illustrated embodiment, mechanical systems 110 include engines 214, 216, transmissions 218, 220, rotor assemblies 222, 224 and pitch control assemblies 226, 228. Engine 214 is preferably a liquid fuel powered engine operable to return power to power system 232 via a generator during rotary operations. Engine 214 drives rotor assembly 222 via transmission 218, which may not include a clutch. Alternatively, engine 214 may have a direct drive relationship with rotor assembly 222. Pitch control assembly 226 preferably includes a rise and fall swash plate operable to provide collective pitch control to rotor assembly 222 in all operational modes of the aircraft. Engine 216 is preferably an electric motor powered by batteries of power systems 232. Engine 216 drives rotor assembly 224 via transmission 220, which may not include a clutch. Alternatively, engine 216 may have a direct drive relationship with rotor assembly 224. Pitch control assembly 228 preferably includes a rise and fall swash plate operable to provide full helicopter type pitch control to rotor assembly 224 including both collective and cyclic pitch control in vertical takeoff and landing mode, collective pitch control in forward flight mode and collective pitch control during rotor-to-wing and wing-to-rotor conversions.

In the preferred configuration of systems 200, liquid fuel can be used to enable endurance in forward flight mode by powering engine 214 to drive rotor assembly 224. In addition, engine 216 may be selectively operated to drive rotor assembly 224 as desired based upon the specific operational requirements of the aircraft. Electrical power can be used to satisfy the high power demands of driving rotor assembly 224 by powering engine 216 in vertical takeoff and landing mode. Accordingly, the use of dedicated engines 214, 216 may provide a more efficient overall drive system for an aircraft of the present disclosure.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tail sitter aircraft comprising:
a fuselage having a forward portion and an aft portion, the forward portion including a nose and forward and aft rotor stations, the nose located forward of the forward and aft rotor stations;
a forward rotor assembly positioned proximate the forward rotor station;
an aft rotor assembly positioned proximate the aft rotor station; and
a tailboom assembly extending from the aft portion of the fuselage, the tailboom assembly including a plurality of landing members;
wherein the nose of the forward portion of the fuselage is substantially non-rotatable relative to the aft portion of the fuselage in a vertical takeoff and landing mode;

wherein the forward rotor assembly has a greater number of rotor blades than the aft rotor assembly;

wherein, in the vertical takeoff and landing mode, the forward and aft rotor assemblies rotate about the fuselage to provide vertical thrust; and wherein, in a forward flight mode, the forward rotor assembly rotates about the fuselage to provide forward thrust and the aft rotor assembly is non-rotatable about the fuselage forming wings to provide lift.

2. The tail sitter aircraft as recited in claim 1 wherein the aft rotor assembly further comprises two rotor blades.

3. The tail sitter aircraft as recited in claim 1 wherein the aft rotor assembly has a larger total rotor disc area than the forward rotor assembly.

4. The tail sitter aircraft as recited in claim 1 wherein the forward rotor assembly has fixed pitch and the aft rotor assembly has cyclic control and collective control.

5. The tail sitter aircraft as recited in claim 1 wherein the forward rotor assembly has collective control and the aft rotor assembly has cyclic control and collective control.

6. The tail sitter aircraft as recited in claim 1 wherein the forward and aft rotor assemblies are generally torque matched in vertical takeoff and landing mode.

7. The tail sitter aircraft as recited in claim 1 wherein the forward and aft rotor assemblies rotate in opposite directions in vertical takeoff and landing mode.

8. The tail sitter aircraft as recited in claim 1 wherein the tailboom assembly further comprises a fixed tailboom assembly.

9. The tail sitter aircraft as recited in claim 1 wherein the tailboom assembly further comprises a plurality of rotatably mounted tail arms having control surfaces;

wherein, in a forward flight configuration, the tail arms are radially retracted to reduce tail surface geometry and provide yaw and pitch control with the control surfaces; and wherein, in a landing configuration, the tail arms are radially extended relative to one another about a longitudinal fuselage axis to form a stable ground contact base with the landing members.

10. The tail sitter aircraft as recited in claim 1 wherein the forward and aft rotor assemblies include rotor blades and wherein, in a storage mode, the rotor blades are folded such that the rotor blades are generally parallel with a longitudinal fuselage axis to reduce aircraft geometry.

11. A method of operating a tail sitter aircraft comprising:
supporting a fuselage in a generally vertical attitude on a surface with a plurality of landing members of a tailboom assembly;
rotating forward and aft rotor assemblies about the fuselage to provide vertical thrust in a vertical takeoff and landing mode;
rotating the forward rotor assembly about the fuselage to provide forward thrust in a forward flight mode; and
forming wings with the aft rotor assembly by preventing rotation of the aft rotor assembly about the fuselage to provide lift in the forward flight mode;
wherein a nose of a forward portion of the fuselage is substantially non-rotatable relative to an aft portion of the fuselage in the vertical takeoff and landing mode; and
wherein the forward rotor assembly has a greater number of rotor blades than the aft rotor assembly.

12. The method as recited in claim 11 wherein rotating the forward and aft rotor assemblies about the fuselage to provide vertical thrust further comprises operating the forward rotor assembly responsive to fixed pitch and operating the aft rotor assembly responsive to cyclic control and collective control.

13. The method as recited in claim 11 wherein rotating the forward and aft rotor assemblies about the fuselage to provide vertical thrust further comprises operating the forward rotor assembly responsive to collective control and operating the aft rotor assembly responsive to cyclic control and collective control.

14. The method as recited in claim 11 wherein rotating the forward and aft rotor assemblies about the fuselage to provide vertical thrust further comprises generally torque matching the forward and aft rotor assemblies.

15. The method as recited in claim 11 wherein rotating the forward and aft rotor assemblies about the fuselage to provide vertical thrust further comprises rotating the forward and aft rotor assemblies in opposite directions.

16. The method as recited in claim 11 further comprising performing a rotor-to-wing conversion of the aft rotor assembly by stopping the rotation of the aft rotor assembly about the fuselage and adjusting an angle of attack of each rotor blade of the aft rotor assembly.

17. The method as recited in claim 11 further comprising performing a wing-to-rotor conversion of the aft rotor assembly by reengaging rotation of the aft rotor assembly about the fuselage.

18. The tail sitter aircraft as recited in claim 1 wherein the forward rotor assembly includes forward rotor blades and the aft rotor assembly includes aft rotor blades and wherein the forward rotor blades have a greater twist than the aft rotor blades.

19. The tail sitter aircraft as recited in claim 1 wherein the forward portion including the nose of the fuselage is substantially non-spinning in the vertical takeoff and landing mode.

20. The tail sitter aircraft as recited in claim 1 further comprising an engine housed by the fuselage, the forward and aft rotor assemblies rotatable relative to the engine in the vertical takeoff and landing mode.

* * * * *